US009069413B2

(12) United States Patent
Lee

(10) Patent No.: US 9,069,413 B2
(45) Date of Patent: Jun. 30, 2015

(54) TOUCH DISPLAY APPARATUS OF VEHICLE AND DRIVING METHOD THEREOF

(71) Applicant: Hyundai Motor Company, Seoul (KR)

(72) Inventor: Jong Bok Lee, Suwon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/141,082

(22) Filed: Dec. 26, 2013

(65) Prior Publication Data

US 2015/0029155 A1 Jan. 29, 2015

(30) Foreign Application Priority Data

Jul. 24, 2013 (KR) ........................ 10-2013-0087630

(51) Int. Cl.
*G06F 3/041* (2006.01)
*G06F 3/042* (2006.01)

(52) U.S. Cl.
CPC .............. *G06F 3/042* (2013.01); *G06F 3/0421* (2013.01); *G06F 3/0425* (2013.01)

(58) Field of Classification Search
None
See application file for complete search history.

(56) References Cited

U.S. PATENT DOCUMENTS

2006/0238510 A1* 10/2006 Panotopoulos et al. ....... 345/168
2010/0171720 A1* 7/2010 Craig et al. .................. 345/173
2011/0043077 A1* 2/2011 Yeh et al. ...................... 310/338
2012/0319981 A1* 12/2012 Habas .......................... 345/173

FOREIGN PATENT DOCUMENTS

JP 2001-202190 A 7/2001
JP 2007-223416 A 9/2007
KR 10-2010-0033658 A 3/2010
KR 10-2012-0030202 A 3/2012
KR 10-2013-0020543 A 2/2013
KR 10-2013-0064003 A 6/2013

* cited by examiner

*Primary Examiner* — Joseph Haley

(74) *Attorney, Agent, or Firm* — McDermott Will & Emery LLP

(57) ABSTRACT

A touch display apparatus of a vehicle includes: a touch panel including a display area for displaying an image and a button area for displaying a button; an ultrasonic wave generator irradiating an airborne ultra sound wave to the button area so that the button area is deformed to a shape of three dimensional button; an image irradiator irradiating the image to the touch panel; and an image capturer capturing the button area in order to determine whether the three dimensional button is touched.

10 Claims, 3 Drawing Sheets

(A)

(B)

TOUCH DISPLAY APPARATUS OF VEHICLE AND DRIVING METHOD THEREOF

CROSS-REFERENCE TO RELATED APPLICATION

This application claims the benefit of priority to Korean Patent Application No. 10-2013-0087630 filed in the Korean Intellectual Property Office on Jul. 24, 2013, the entire contents of which are incorporated herein by reference.

TECHNICAL FIELD

The present disclosure relates to a touch display apparatus of vehicle and driving method thereof.

BACKGROUND

Recently, various input devices, such as, a key pad, a jog dial, and a touch screen, are developed for inputting various function commands. Since a handling method of the touch screen is simple comparing to those of the key pad and the jog dial, the touch screen is applied to an audio video navigation (AVN) and cluster of a vehicle.

Generally, since the touch screen is formed in a plane shape, it is difficult to be matched with a curved design inside the vehicle. Also, since a design of a display module changes according to the inner design of the vehicle, manufacturing cost will be necessarily increased.

To overcome the above problem, a touch display apparatus is developed based on a camera that is possible to be installed in the curved portion inside the vehicle, display information of the vehicle, and recognized user's touch.

General touch display apparatus based on the camera includes a projector irradiating an image to a rear side of a touch screen, a lighting unit irradiating infrared light, and a camera photographing an image reflected from the touch screen.

According to the general touch display apparatus, when a user touches a predetermined area of the touch screen, infrared light irradiated from the lighting unit is reflected by the user's hand. The camera acquires an image reflected from the touch screen through an infrared filter. And user's touch is recognized by the acquired image.

However, according to the general touch display apparatus based on camera, since the touch screen is made of acryl plated, a physical button cannot be disposed on the touch screen.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a touch display apparatus of vehicle and a driving method that is possible to design a curved shape and deform a touch screen to a physical button.

A touch display apparatus according to an exemplary embodiment of the present disclosure includes: a touch panel including a display area for displaying an image and a button area for displaying a button; an ultrasonic wave generator irradiating an airborne ultra sound wave to the button area so that the button area is deformed to a shape of three dimensional button; an image irradiator irradiating the image to the touch panel; and an image capturer capturing the button area in order to determine whether the three dimensional button is touched.

The touch panel includes an acryl substrate provided in corresponding to the display area, and a silicon substrate provided in corresponding to the button area. The touch panel is formed in a curved shape.

The image irradiator irradiates a button image including an edge of the button or characters displaying a function of the button. The image capturer includes an infrared camera photographing an infrared image of the button area in order to detect user's touch touching the button area.

The touch display apparatus further includes a controller detecting a position of user's touch of the button and controlling a device of the vehicle. The image irradiator includes a projector generating an image and a reflection mirror reflecting the image generated at the projector to the display area.

A method for driving of touch display apparatus of a vehicle according to an exemplary embodiment of the present disclosure comprises applying a pressure to the button area using an airborne ultra sound wave generated at the ultrasonic wave; deforming the button area to three dimensional button shape; photographing an image of the button area; and detecting a position of user's touch by the image.

The step of photographing an image of the button area includes: irradiating infrared light to the touch panel; photographing an infrared image irradiated to the touch panel. The method for driving of touch display apparatus of vehicle further includes irradiating a button image including an edge of the button or characters displaying a function of the button.

DETAILED DESCRIPTION OF THE EMBODIMENTS

Figure 1:
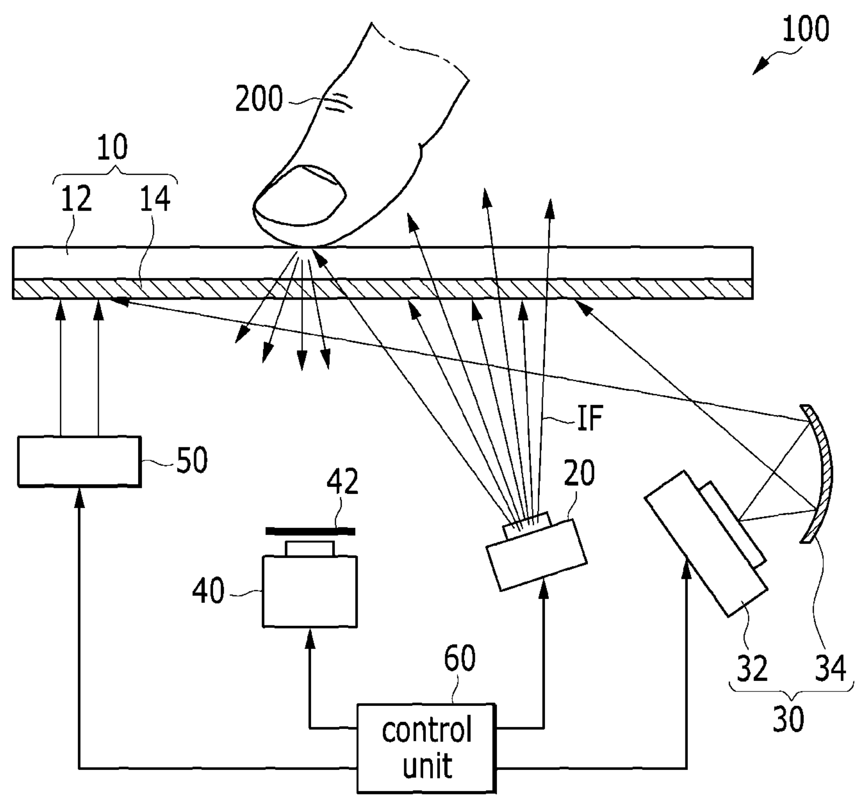
FIG. 1 shows a touch display apparatus according to an exemplary embodiment of the present disclosure.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

The present disclosure will be described more fully hereinafter with reference to the accompanying drawings, in which exemplary embodiments of the invention are shown.

FIG. 1 shows a touch display apparatus according to an exemplary embodiment of the present disclosure. And FIG. 2 conceptually shows a touch panel according to an exemplary embodiment of the present disclosure.

Referring to FIG. 1, a touch display apparatus 100 according to an exemplary embodiment of the present disclosure includes a touch panel 10, a lighting unit 20, an image irradiator 30, an image capturer 40, an ultrasonic wave generator 50 and a controller 60. In this configuration, the touch panel 10 includes a substrate 12 which is touched by a user 200 and a diffusion film 14 which is disposed on a back surface of the substrate 12

The substrate 12 may a form corresponding to a curved surface in a vehicle. For example, the substrate 12 may be formed in an AVN, a cluster, a dash board, and the like, in the vehicle.

Figure 2:
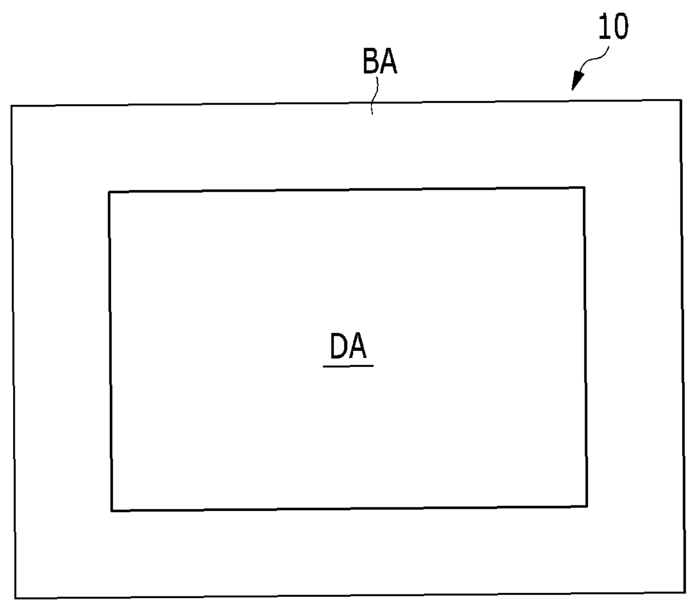
FIG. 2 conceptually shows a touch panel according to an exemplary embodiment of the present disclosure.

As shown in FIG. 2, the substrate 12 according to an exemplary embodiment of the present disclosure includes a display area (DA) for displaying an image and a button area (BA) for displaying a button. The substrate 12*a* provided in corresponding to the display area (DA) is made of transparent material where an infrared light can be transmitted and the image can be formed, for example acryl substrate. The substrate 12*b* provided in corresponding to the button area (BA) is made of a flexible material which is deformed by the ultrasonic wave, for example a silicon substrate. The diffusion film 14 diffuses the image irradiated from the image irradiator 30.

The lighting unit 20 irradiates infrared light to the touch panel 10. The lighting unit 20 may include infrared lighting module. The image irradiator 30 irradiates an image to the touch panel 10.

Here, the image irradiator 30 includes a projector module 32 and a reflection mirror 34 reflecting the image generated at the projector module 32 and irradiating the image to the touch panel 10. The reflection mirror 34 may be an a spherical surface reflection mirror.

The image irradiator 30 can irradiate a graphic image to the display area (DA) of the touch panel 10 and a button image to the button area (BA). For example, the button image may include an edge of the button or characters displaying a function of the button.

The image capturer 40 acquires the image of the touch panel 10. The image capturer 40 includes an infrared camera photographing an infrared image of the button area in order to detect user's touch touching the button area. Thus, the image capturer 40 may include an infrared filter 42 selectively filtering infrared light.

The ultrasonic wave generator 50 generates an airborne ultrasound to the button area (BA) of the touch panel 10. Thus, ultrasonic wave generator 50 includes an airborne ultrasound vibration module.

The controller 60 controls the touch panel 10, the lighting unit 20, the image irradiator 30, the image capturer 40 and the ultrasonic wave generator 50.

Figure 3:
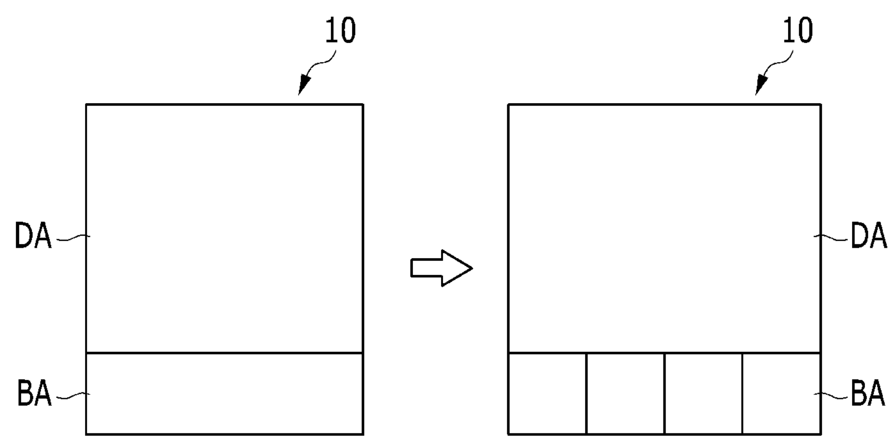
FIGS. 3(A) and 3(B) conceptually show a touch panel to explain a driving method according to an exemplary embodiment of the present disclosure
Figure 3:
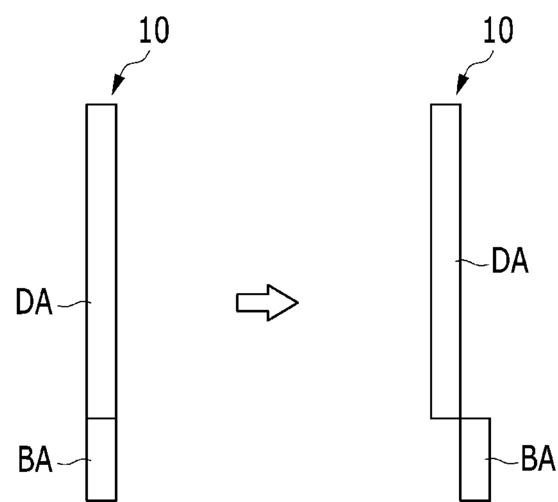

FIG. 3 conceptually shows a touch panel to explain a driving method according to an exemplary embodiment of the present disclosure. FIG. 3(A) is a top plan view of the touch panel and FIG. 3(B) is a side view of the touch panel.

Referring to FIGS. 3(A) and 3(B), the airborne sound wave generated at the ultrasonic wave generator 50 is transmitted to the button area (BA) of the touch panel 10. The button area (BA) made of silicon material is deformed as three dimensional button shape (for example arrow shape) by an airborne sound wave. And the image irradiator 30 irradiates the button image on the button area (BA).

And the user selects three dimensional button formed at the button area (BA). Then, the image capturer 40 photographs an infrared image of the button area (BA) and the controller 60 determines a position that the user selects using the infrared image of the button area (BA).

The controller 60 performs a control function corresponding to the button formed at the button area.

That is, according to an exemplary present disclosure, the user can feel the three dimensional button of the button area and select a desired button of the touch panel 10.

According to an exemplary present disclosure, the touch display apparatus can be designed in a curved shape and the touch panel is deformed in a three dimensional button shape.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A touch display apparatus of a vehicle comprising:

a touch panel including a display area for displaying an image and a button area for displaying a button;

an ultrasonic wave generator irradiating an airborne ultra sound wave to the button area so that the button area is deformed to a shape of three dimensional button;

an image irradiator irradiating the image to the touch panel; and an image capturer capturing the button area in order to determine whether the three dimensional button is touched.

2. The touch display apparatus of vehicle of claim 1, wherein the touch panel includes:

an acryl substrate provided in corresponding to the display area; and a silicon substrate provided in corresponding to the button area.

3. The touch display apparatus of vehicle of claim 1, wherein the touch panel is formed in a curved shape.

4. The touch display apparatus of vehicle of claim 1, wherein the image irradiator irradiates a button image including an edge of the three dimensional button or characters displaying a function of the three dimensional button.

5. The touch display apparatus of vehicle of claim 1, wherein the image capturer includes an infrared camera photographing an infrared image of the button area in order to detect user's touch touching the button area.

6. The touch display apparatus of vehicle of claim 1, further comprising a controller detecting a position of user's touch of the button and controlling a device of the vehicle.

7. The touch display apparatus of vehicle of claim 1, wherein the image irradiator includes a projector generating an image and a reflection mirror reflecting the image generated at the projector to the display area.

8. A method for driving of touch display apparatus of a vehicle, the touch display apparatus including a touch panel including a display area for displaying an image and a button area for displaying a button, an ultrasonic wave generator irradiating airborne ultra sound wave, an image irradiator irradiating the image to the touch panel, and an image capturer capturing the button area, the method comprising:

applying a pressure to the button area using an airborne ultra sound wave generated at the ultrasonic wave;

deforming the button area to a shape of three dimensional button;

capturing an image of the button area; and detecting a position of user's touch by the image.

9. The method for driving of touch display apparatus of vehicle of claim 8, wherein the step of capturing an image of the button area includes:

irradiating an infrared light to the touch panel;

photographing an infrared image irradiated to the touch panel.

10. The method for driving of touch display apparatus of vehicle of claim 8, further comprising irradiating a button image including an edge of the button or characters displaying a function of the button.

* * * * *